United States Patent
Chen et al.

(10) Patent No.: US 11,077,357 B2
(45) Date of Patent: Aug. 3, 2021

(54) SKATEBOARD

(71) Applicant: GoodMen Household Products Technology (Shenzhen) Co., Ltd., Shenzhen (CN)

(72) Inventors: Yi-Hong Chen, Shantou (CN); Chu-Feng Lin, Huilai County (CN)

(73) Assignee: GoodMen Household Products Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/663,681

(22) Filed: Oct. 25, 2019

(65) Prior Publication Data

US 2021/0121769 A1    Apr. 29, 2021

(51) Int. Cl.
| A63C 17/04 | (2006.01) |
| A63C 17/12 | (2006.01) |
| A63C 17/01 | (2006.01) |
| B60B 33/04 | (2006.01) |
| A63C 17/26 | (2006.01) |
| A63C 17/28 | (2006.01) |
| B62K 3/00  | (2006.01) |

(52) U.S. Cl.
CPC ............ *A63C 17/12* (2013.01); *A63C 17/013* (2013.01); *A63C 17/014* (2013.01); *B60B 33/045* (2013.01); *A63C 17/265* (2013.01); *A63C 17/28* (2013.01); *B62K 3/002* (2013.01)

(58) Field of Classification Search
CPC ...... A63C 17/01; A63C 17/014; B62K 3/002; B62K 9/00; B62K 5/02; B60B 33/045
See application file for complete search history.

(56) References Cited

U.S. PATENT DOCUMENTS

| 2,738,542 | A | * | 3/1956 | Clark, Jr. | B60B 33/045 16/44 |
| 2,915,776 | A | * | 12/1959 | Hanson | B60B 33/045 16/44 |
| 5,201,659 | A | * | 4/1993 | Nelson | A63B 21/0004 280/87.042 |
| 5,347,681 | A | * | 9/1994 | Wattron | A63C 17/0033 16/30 |
| 6,357,077 | B1 | * | 3/2002 | Jones, Jr. | B60B 33/045 16/35 D |
| 6,367,828 | B1 | * | 4/2002 | Mandic | B60T 1/14 280/87.05 |

(Continued)

*Primary Examiner* — Emma K Frick
(74) *Attorney, Agent, or Firm* — Karin L. Williams; Mayer & Williams PC

(57) ABSTRACT

A skateboard includes a board body having a first section and a second section, at least a first wheel set connected to the first section, and at least two second wheel sets connected to the second section. The first wheel set includes a first base protruding from the first section. Each second wheel set includes a second base protruding from the second section and defines a reference line passing through a center of the second base. Both of the bases slope at an angle of 5 to 35 degrees respectively. An angle of not more than 60 degrees is formed between the reference line and a baseline passing axially through a center of the board body. The skateboard moves forward when the wheel sets are triggered by twisting a body of a user and a moving direction is changeable by shifting a center of gravity of the user.

8 Claims, 16 Drawing Sheets

(56) References Cited

U.S. PATENT DOCUMENTS

| | | | | |
|---|---|---|---|---|
| 6,428,022 B1* | 8/2002 | Namiki | A63C 17/01 | 280/268 |
| 6,460,868 B2* | 10/2002 | Madrid | A63C 17/01 | 144/349 |
| 6,511,083 B1* | 1/2003 | Tsai | A63C 17/01 | 280/87.021 |
| 6,561,530 B2* | 5/2003 | Carbonero | A63C 17/0033 | 280/79.11 |
| 7,178,813 B1* | 2/2007 | Bruntmyer | B60B 33/0007 | 280/87.041 |
| 7,226,062 B1* | 6/2007 | Stefano | A63C 17/014 | 280/87.041 |
| 8,079,604 B2* | 12/2011 | Newton | A63C 17/01 | 280/11.27 |
| 8,448,955 B2* | 5/2013 | Kinnaman | A63C 17/0033 | 280/11.27 |
| 8,459,669 B2* | 6/2013 | Lin | A63C 17/014 | 280/87.042 |
| 8,523,205 B2* | 9/2013 | Hsu | A63C 17/014 | 280/87.042 |
| 8,562,004 B2* | 10/2013 | Stillinger | A63C 17/01 | 280/87.021 |
| 8,567,803 B2* | 10/2013 | Bao | B62K 9/00 | 280/218 |
| 8,607,414 B1* | 12/2013 | Kinsela | B60B 33/045 | 16/44 |
| 8,708,354 B2* | 4/2014 | Young | A63C 17/012 | 280/87.042 |
| 9,186,570 B1* | 11/2015 | Wells | A63C 17/015 | |
| 9,327,553 B2* | 5/2016 | Woodrum | B60G 11/16 | |
| 9,682,309 B2* | 6/2017 | Huang | A63C 17/0033 | |
| 10,022,615 B2* | 7/2018 | Huang | A63C 17/04 | |
| 10,052,520 B2* | 8/2018 | Kramer | A63B 21/4033 | |
| 2004/0036247 A1* | 2/2004 | Lee | B62K 3/002 | 280/221 |
| 2006/0170172 A1* | 8/2006 | Kang | A63C 17/0046 | 280/62 |
| 2007/0278758 A1* | 12/2007 | Kwak | A63C 17/01 | 280/87.042 |
| 2010/0117317 A1* | 5/2010 | Smith | A63C 17/014 | 280/87.042 |
| 2012/0080860 A1* | 4/2012 | Park | A63C 17/014 | 280/87.042 |
| 2014/0210175 A1* | 7/2014 | Hsu | A63C 17/017 | 280/87.042 |

* cited by examiner

SKATEBOARD

BACKGROUND OF THE INVENTION

1. Field of the Invention

This invention relates to a skateboard and relates particularly to a skateboard adapted to be propelled by twisting.

2. Description of the Related Art

In recent years, because concepts of environmental awareness and low-carbon life have been become popular and techniques are fully developed, light vehicles for personal use are developed, especially skateboards which are characterised by flexibility, lightweight and environmental friendliness. Skateboards not only save walking time, but also are easy to get started and operate, and therefore skateboards are beloved of young people. Referring to FIG. 1, a conventional skateboard 1 comprises a board body 11, a first wheel 12 and a second wheel 13 pivotally disposed at a bottom the board body 11 respectively. While riding the skateboard 1, a user stands on the board body 11 with one foot and uses the other foot to push against a ground surface 2 to thereby move the first wheel 12 and the second wheel 13 frontward and further carry out a movement of the skateboard 1. Thus, the user can keep the skateboard 1 to move forward and maintain a moving speed by pushing against the ground surface 2 with the foot continuously.

However, the movement of the conventional skateboard 1 is mostly in a straight line and relies on the pushing motions of foot and the balance of weight to allow the skateboard 1 to attain the rectilinear motion. Although the skateboard 1 can attain the effect of exercising through the pushing motions of foot, it is monotonous and can only exercise muscles of legs. Further, skateboard 1 riding is still difficult for some age groups, and therefore a range of the suitable age group is limited, and that requires to be improved.

SUMMARY OF THE INVENTION

The object of this invention is to provide a skateboard capable of carrying out a movement and changing a moving direction by twisting a body and changing a center of gravity to thereby increase safety and stability of use and effectively train different muscles.

The skateboard of this invention is adapted to be propelled by twisting and comprises a board body and a propelling wheel assembly connected to the board body for moving on a ground surface. The board body has a first section and a second section. The propelling wheel assembly has at least a first wheel set pivotally connected to a first bottom of the first section facing the ground surface and at least two second wheel sets pivotally connected to a second bottom of the second section facing the ground surface. The first wheel set has a first base meeting the first bottom at a first joint and projecting from the first bottom, a first holder connected to the first base, and a first wheel pivotally disposed on the first holder. Each second wheel set has a second base meeting the second bottom at a second joint and projecting from the second bottom, a second holder connected to the second base, and a second wheel pivotally disposed on the second holder. A horizontal line is defined by passing through the first joint and the second joint respectively and is parallel to the ground surface. The first base is inclined to the horizontal line at a first angle. Each second base is inclined to the horizontal line at a second angle. A reference line is defined by passing through a center of each second base. A third angle is formed between the reference line and a baseline passing axially through a center of the board body. Thus, the first angle, the second angle and the third angle allow a user to move the first wheel and the second wheels through twisting a body and change a moving direction properly through shifting a center of gravity, thereby training different muscles and increasing the safety and stability of use.

Preferably, a distance defined between the ground surface and the second central end is larger than a distance defined between the ground surface and the first central end.

Preferably, the board body has a plurality of slots formed on the first top and the second top.

Preferably, the first top and the second top are provided with a friction surface.

Preferably, a main holding portion is formed on the second section.

Preferably, a seat portion is installed on the board body.

Preferably, the seat portion has two opposite auxiliary holding portions.

Preferably, a support rod is disposed on the board body and a handle portion is connected to the support rod.

Preferably, a control set is installed on each second holder. Each second holder has a pair of opposite grooves. The control set has a pair of limit units each disposed at one end of each groove, a pair of engagement units penetrating the grooves and the second wheel and engaged together, and a pair of elastic units sleevedly disposed on the engagement units and capable of being compressed between the engagement units and the limit units.

BRIEF DESCRIPTION OF THE DRAWINGS

FIG. 9 is an exploded view showing that the control set is disposed on each second wheel set;

DETAILED DESCRIPTION OF THE PREFERRED EMBODIMENTS

Figure 1:
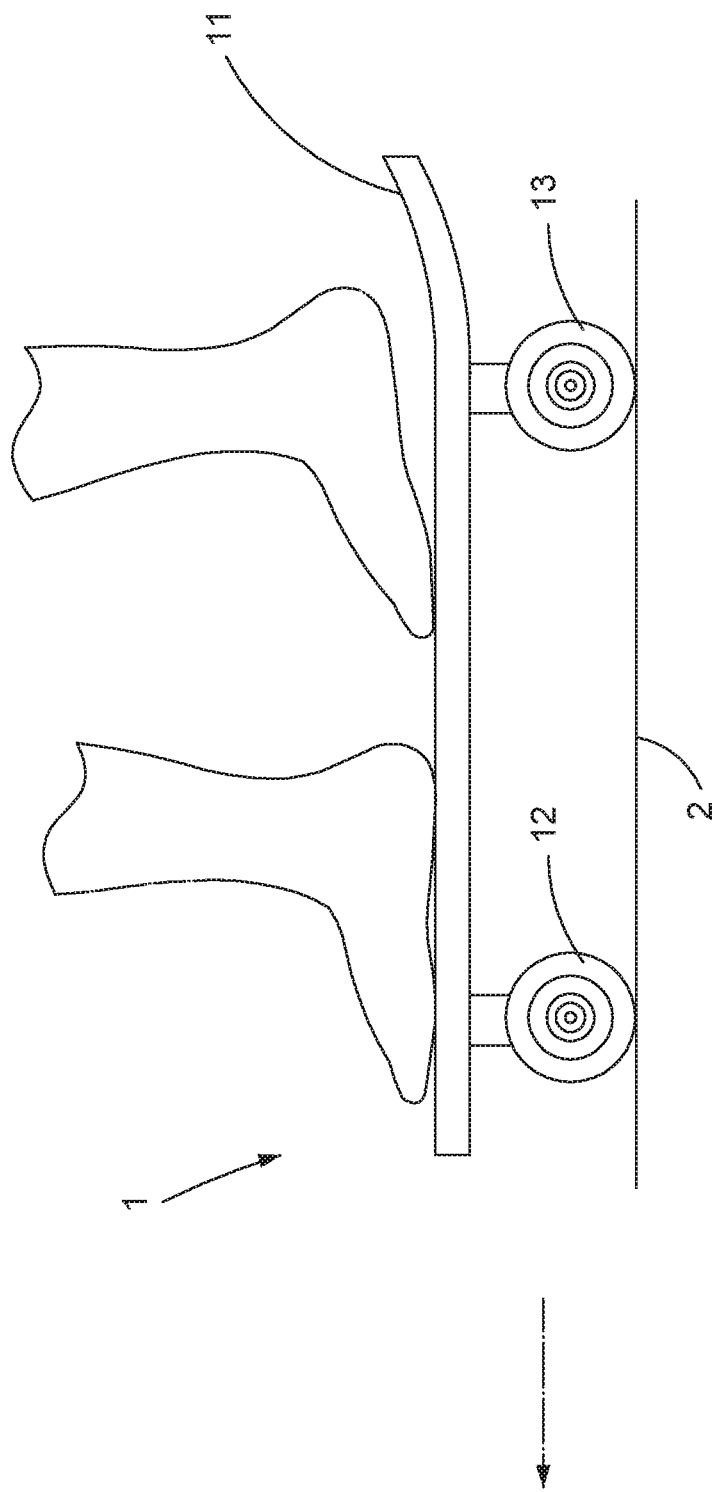
FIG. 1 is a schematic view showing a conventional skateboard.
Figure 2:
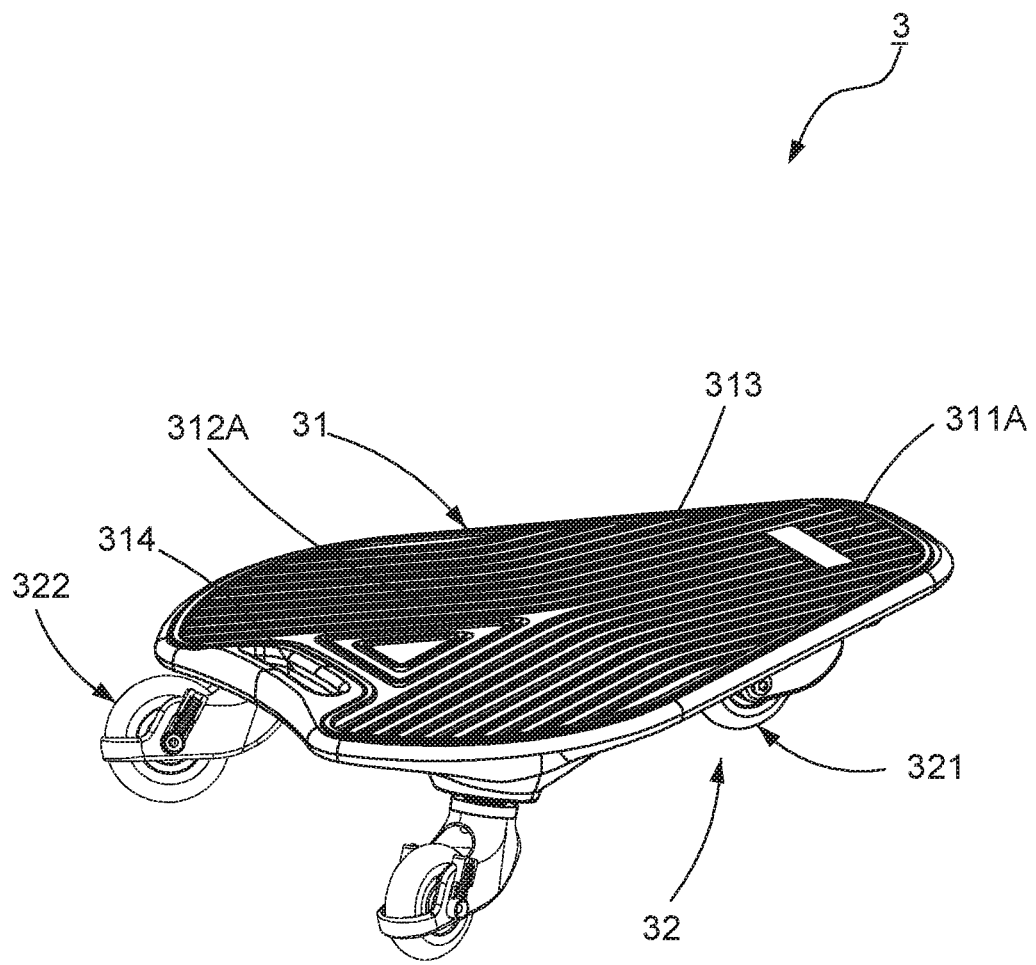
FIG. 2 is a perspective view showing a first preferred embodiment of this invention.
Figure 3:
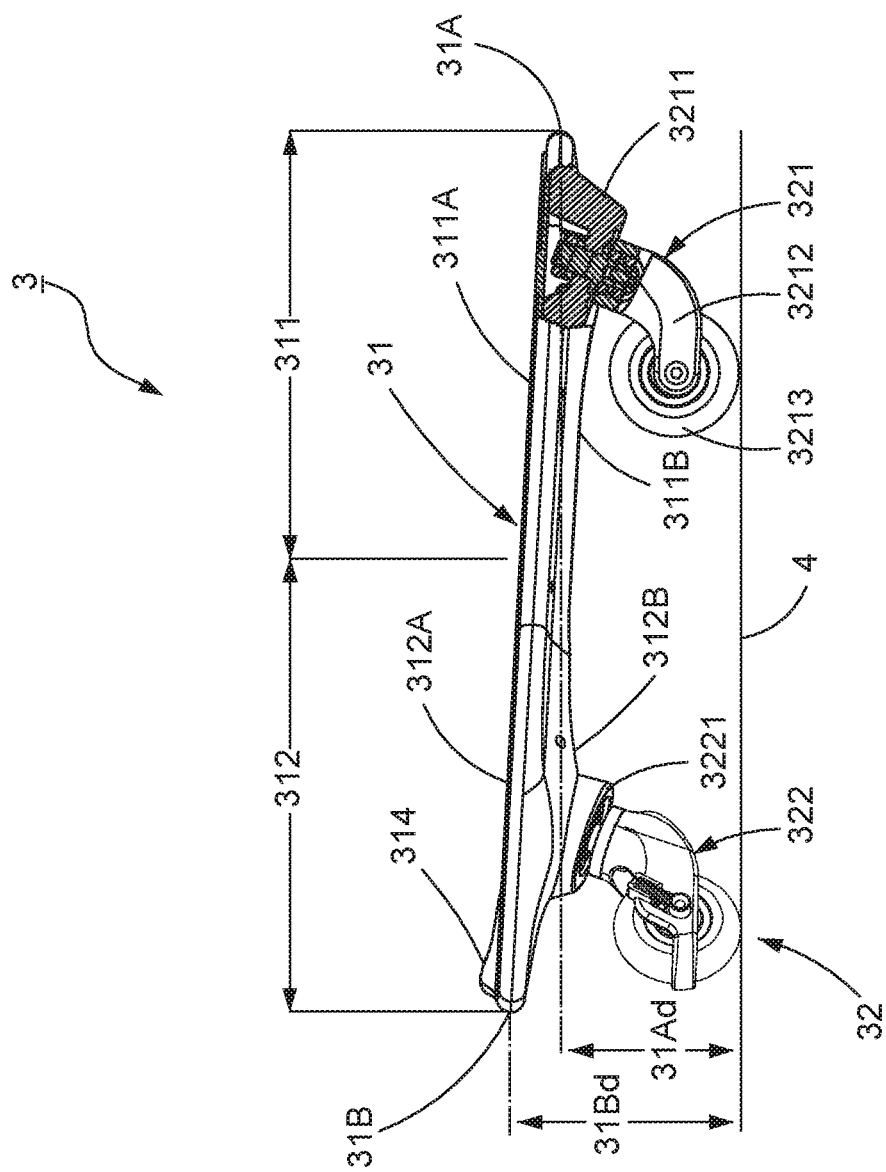
FIG. 3 is a schematic view showing that the distance between the ground surface and the second central end and the distance between the ground surface and the first central end are defined.
Figure 4:
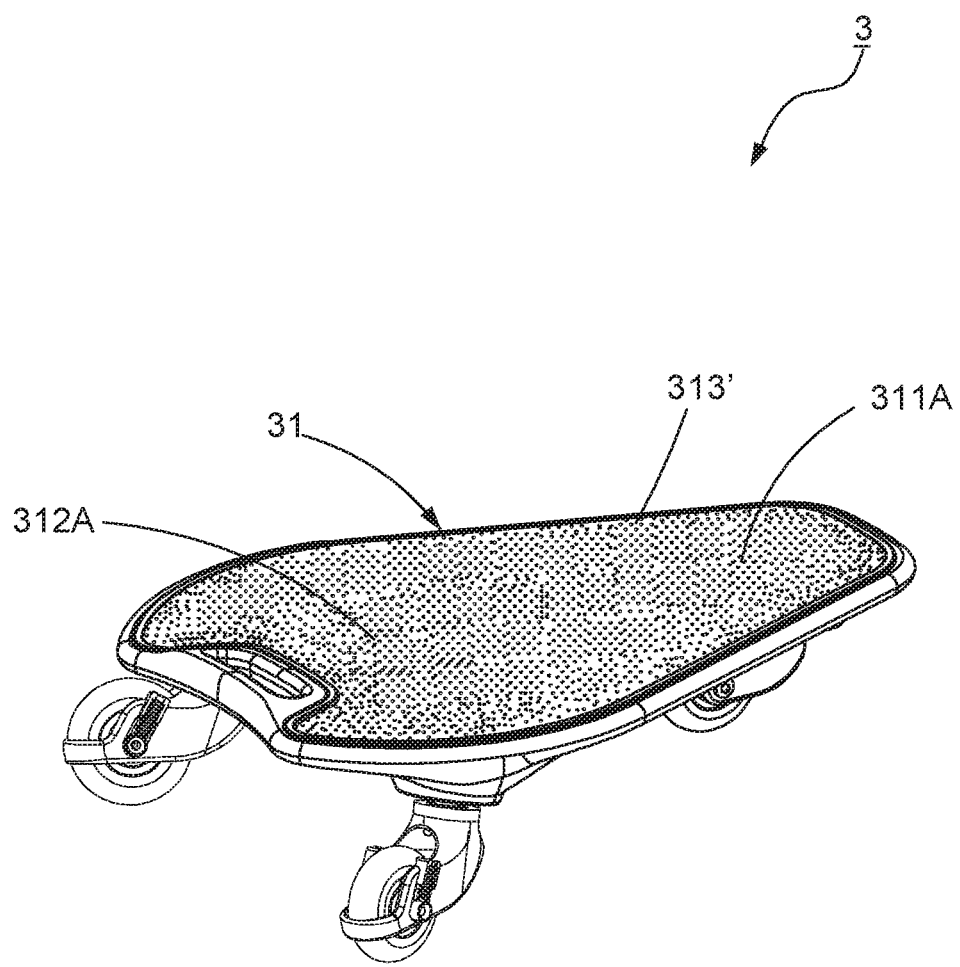
FIG. 4 is a perspective view a further variation of the first preferred embodiment where the friction surface is formed on the first top and the second top.

Referring to FIG. 2 and FIG. 3, a first preferred embodiment of a skateboard 3 of this invention is adapted to be propelled by twisting. The skateboard 3 includes a board body 31 formed with a first central end 31A and a second central end 31B opposite to the first central end 31A, and a propelling wheel assembly 32 connected to the board body 31 for moving on a ground surface 4. The board body 31 has a first section 311 extending from the first central end 31A and a second section 312 extending from the first section 311 to the second central end 31B. In this preferred embodiment, a distance 31Bd defined between the ground surface 4 and the second central end 31B is larger than a distance 31Ad defined between the ground surface 4 and the first central end 31A to thereby keep a center of gravity of a user in the first section 311, as shown in FIG. 3. Meanwhile, the first section 311 has a first top 311A opposite to a first bottom 311B facing the ground surface 4. The second section 312 has a second top 312A opposite to a second bottom 312B facing the ground surface 4. The board body 31 has a plurality of slots 313 formed on the first top 311A and the second top 312A. Alternatively, the first top 311A and the second top 312A are provided with a friction surface 313' as shown in FIG. 4. Both the slots 313 and the friction surface 313' can increase the friction force when the user contacts with the first top 311A and the second top 312A of the board body 31 to thereby effectively transmit the twist force of the user to the board body 31 and further carry out a movement of the propelling wheel assembly 32. Further, a main holding portion 314 is formed on the second section 312 to allow the user to carry the skateboard 3 through holding the main holding portion 314. Here takes FIG. 2 as example that the first top 311A and the second top 312A are formed with the slots 313 and the main holding portion 314 is disposed on the second section 312.

Figure 5:
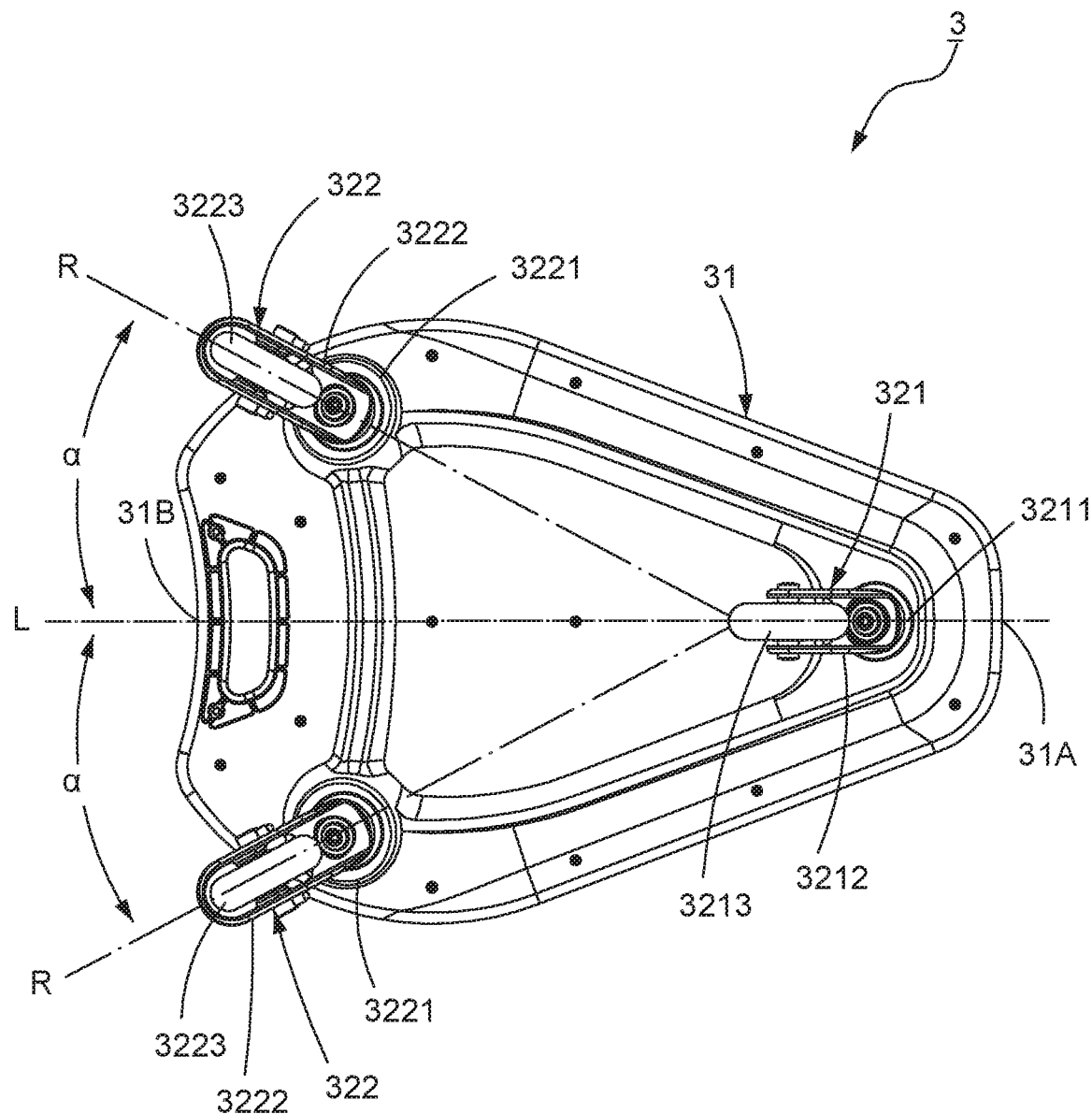
FIG. 5 is a schematic view showing that the third angle is formed between the reference line and the baseline.
Figure 6:
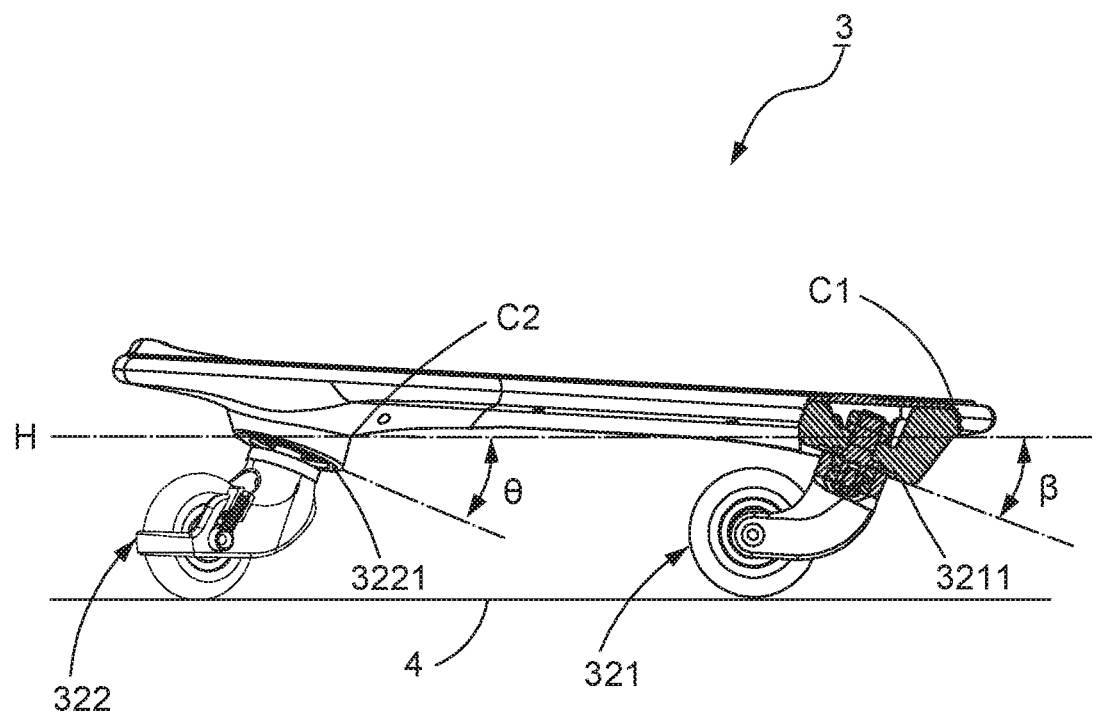
FIG. 6 is a schematic view showing that the first angle and the second angle are defined.

Referring to FIG. 3, FIG. 5 and FIG. 6, the propelling wheel assembly 32 has at least a first wheel set 321 pivotally connected to the first bottom 311B and at least two second wheel sets 322 pivotally connected to the second bottom 312B. The first wheel set 321 has a first base 3211 meeting the first bottom 311B at a first joint C1 and projecting from the first bottom 311B, a first holder 3212 connected to the first base 3211, and a first wheel 3213 pivotally disposed on the first holder 3212. Each second wheel set 322 has a second base 3221 meeting the second bottom 3123 at a second joint C2 and projecting from the second bottom 3128, a second holder 3222 connected to the second base 3221, and a second wheel 3223 pivotally disposed on the second holder 3222. A horizontal line H passes through the first joint C1 and through the second joint C2 respectively and is parallel to the ground surface 4. Referring to FIG. 6, the first base 3211 is inclined to the horizontal line H at a first angle β ranging from 5 to 35 degrees. Each second base 3221 is inclined to the horizontal line B at a second angle θ ranging from 5 to 35 degrees. Referring to FIG. 5, a reference line R is defined by passing through a center of each second base 3221. The board body 31 defines a baseline L passing axially from the first central end 31A to the second central end 31B and through a center of the board body 31. A third angle α is formed between the reference line R and the baseline L and is not more than 60 degrees. The third angle α can be below 60 degrees or equal to 60 degrees. Further, the first wheel set 321 is placed in the baseline L.

Figure 7:
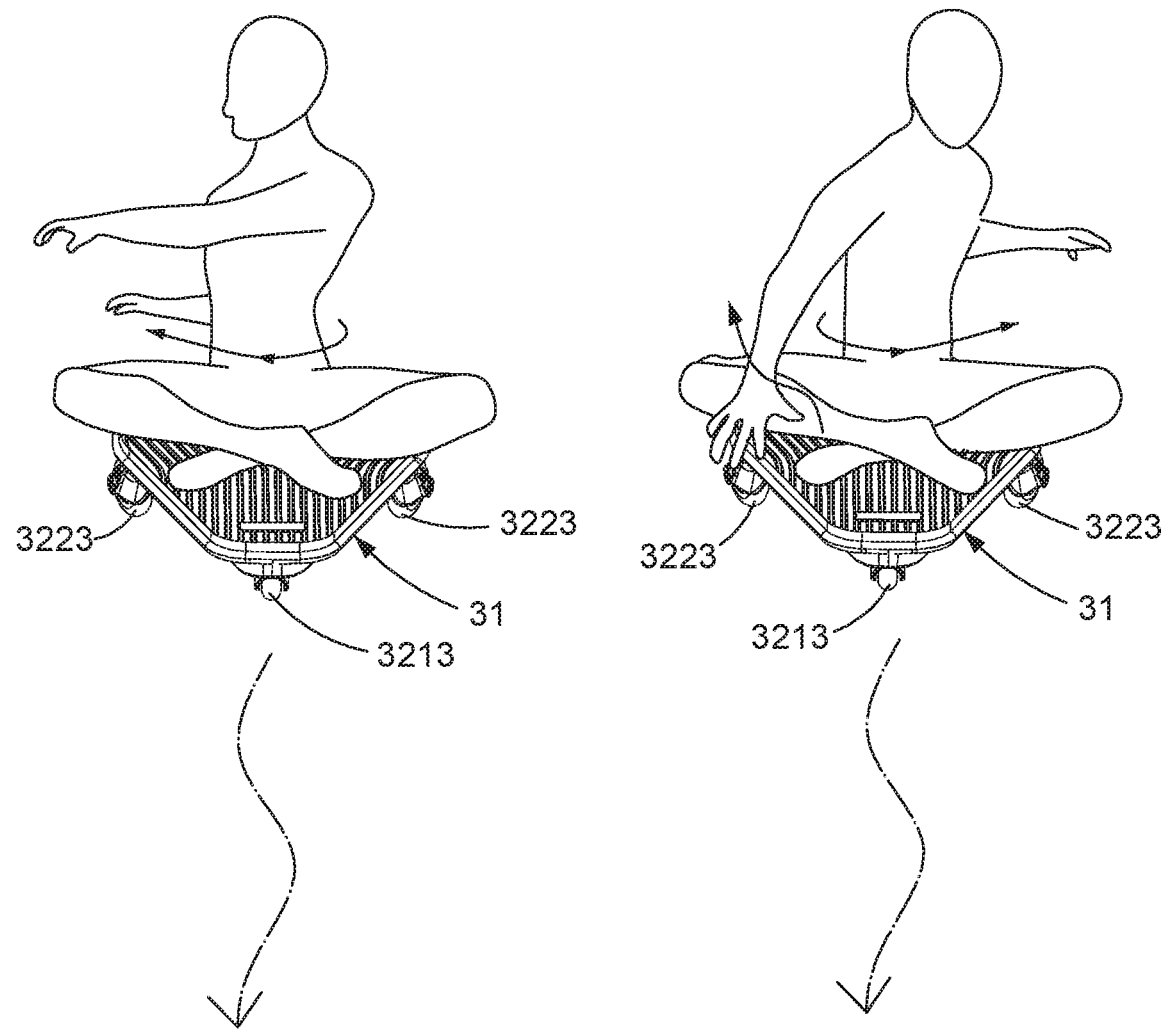
FIG. 7 is a schematic view showing that the first wheel set and the second wheel sets are propelled when a user sits on the board body and twists a body.
Figure 8:
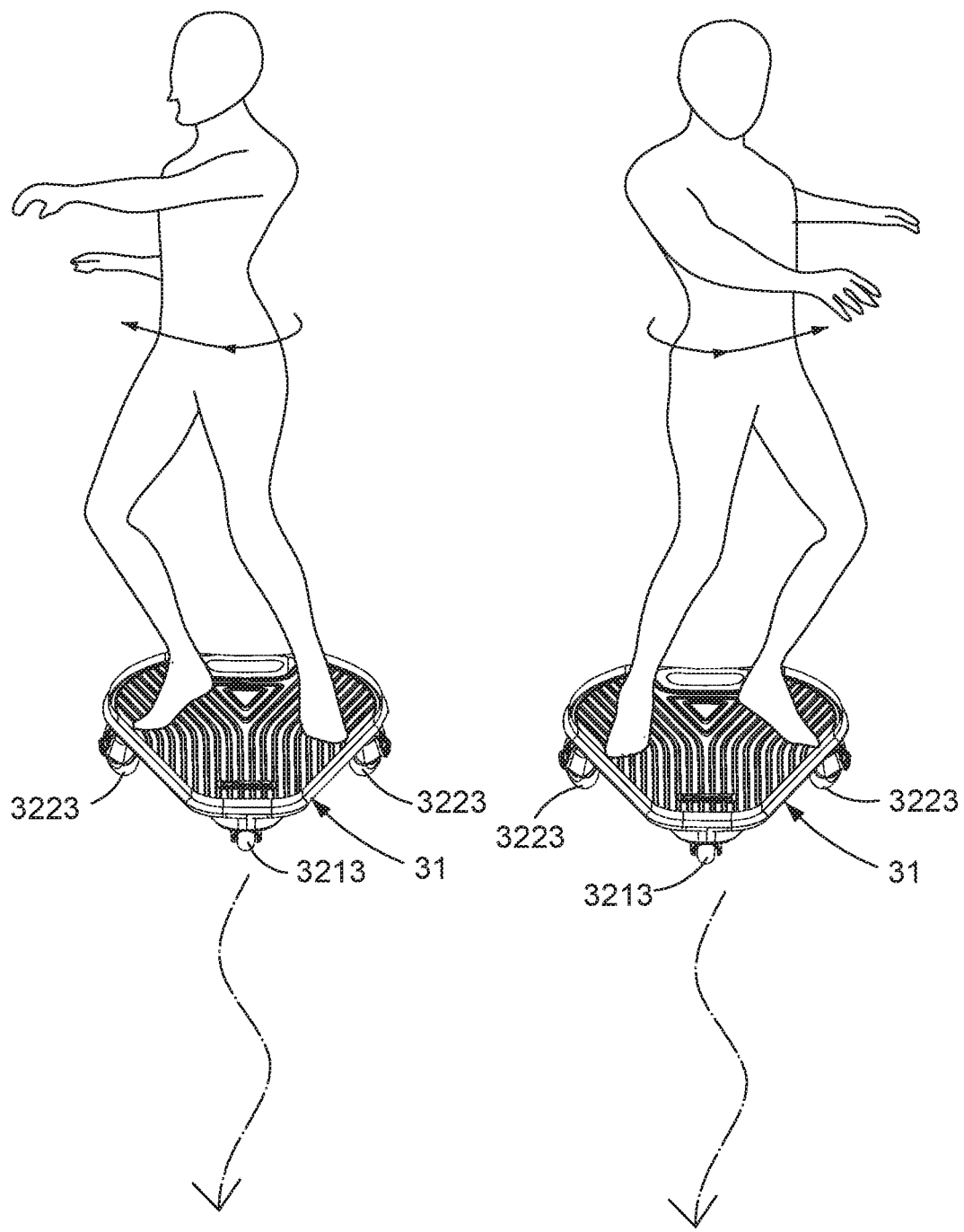
FIG. 8 is a schematic view showing that the first wheel set and the second wheel sets are propelled when a user stands on the board body and twists a body.

Referring to FIG. 2 and FIG. 3, while riding the skateboard 3, sitting position as shown in FIG. 7 or standing position as shown in FIG. 8 can be applied to allow the user to sit or stand on the first top 311A and the second top 312A of the board body 31. The user then wiggles the skateboard 3 by twisting a body back and forth, namely twisting the body in a snake-like motion to generate the twist force.

The twist force is then transmitted from the first top 311A and the second top 312A to the first bottom 311B and the second bottom 312B and further to the first wheel set 321 and the second wheel sets 322, and then propels the first wheel 3213 and the second wheels 3223 to move forward. Thus, the user can keep the skateboard 3 to move forward by twisting and swing the body continuously to allow the twist force to carry out the forward movement of the skateboard 3. Meanwhile, a moving speed is directly proportional to the range and frequency of twisting and swinging motion of the user. When the user stands or sits on the board body 31, the user can change a moving direction of the skateboard 3 by shifting a center of gravity from side to side to make a turn of the skateboard 3 in order to control the moving direction of the skateboard 3, thereby increasing the controllability of the skateboard 3. After the user stops twisting and swinging the body, the forward movement of the skateboard 3 is gradually reduced by the downward pressure caused by a weight of the user. Therefore, the moving speed of the skateboard 3 is gradually slowed because the downward pressure counteracts the remained twist force and no twist force is applied since the user stops twisting the body. Finally, the first wheel 3213 and the second wheels 3223 stop moving. Thus, the safety of use is increased. Therefore, the user can ride the skateboard 3 easily without any professional training. Meanwhile, the twisting and swinging motions can help train different muscles, enhance the muscular strength, and improve the flexibility and agility of the lumbar vertebrae and the hip joint. Finally, after the user finishes riding the skateboard 3, the user can carry the skateboard 3 through holding the main holding portion 314 by hand to thereby carry the skateboard 3 conveniently.

Figure 9:
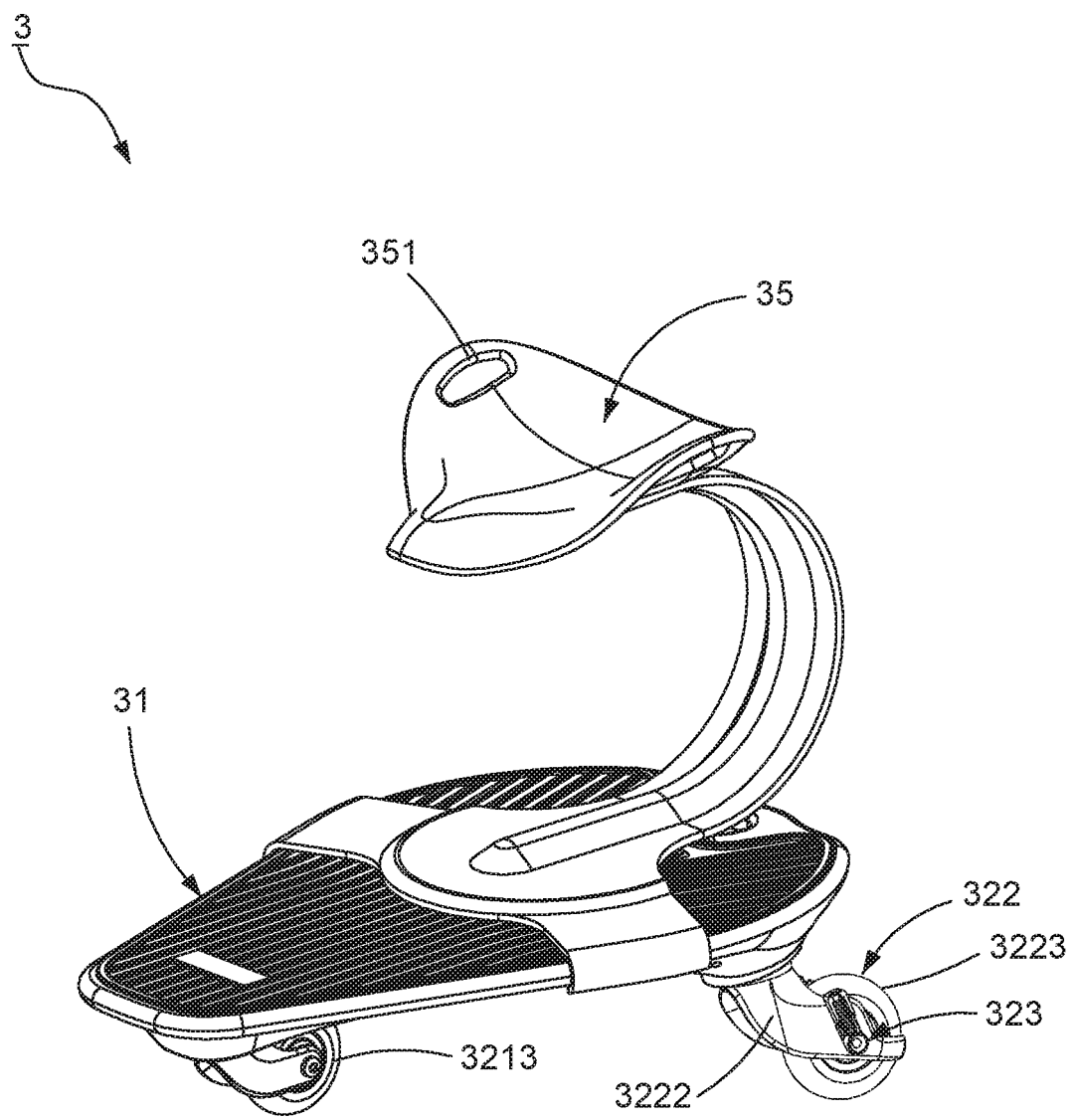
FIG. 9 is a perspective view showing a second preferred embodiment of this invention where the seat portion is disposed on the board body.
Figure 10:
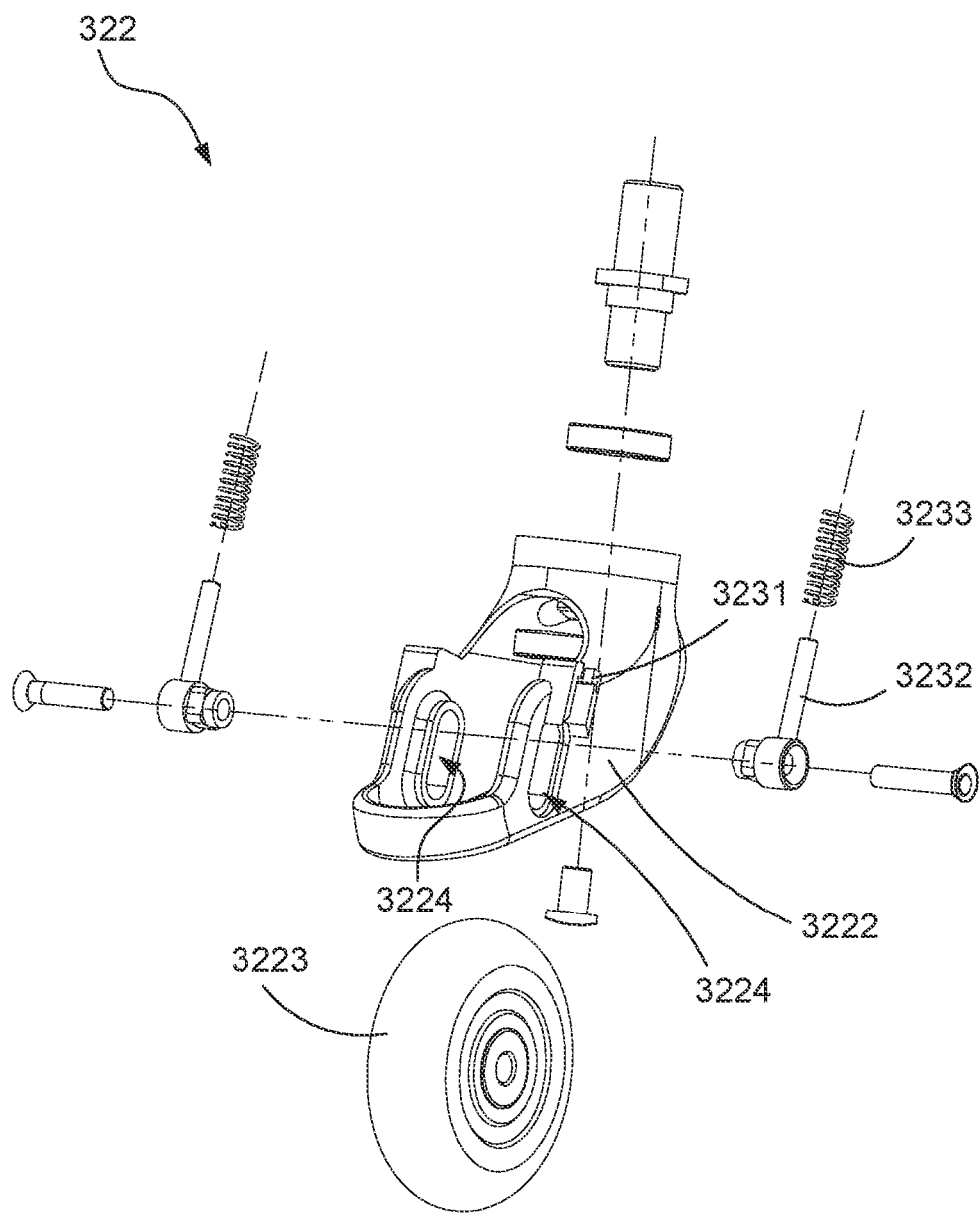
Figure 11:
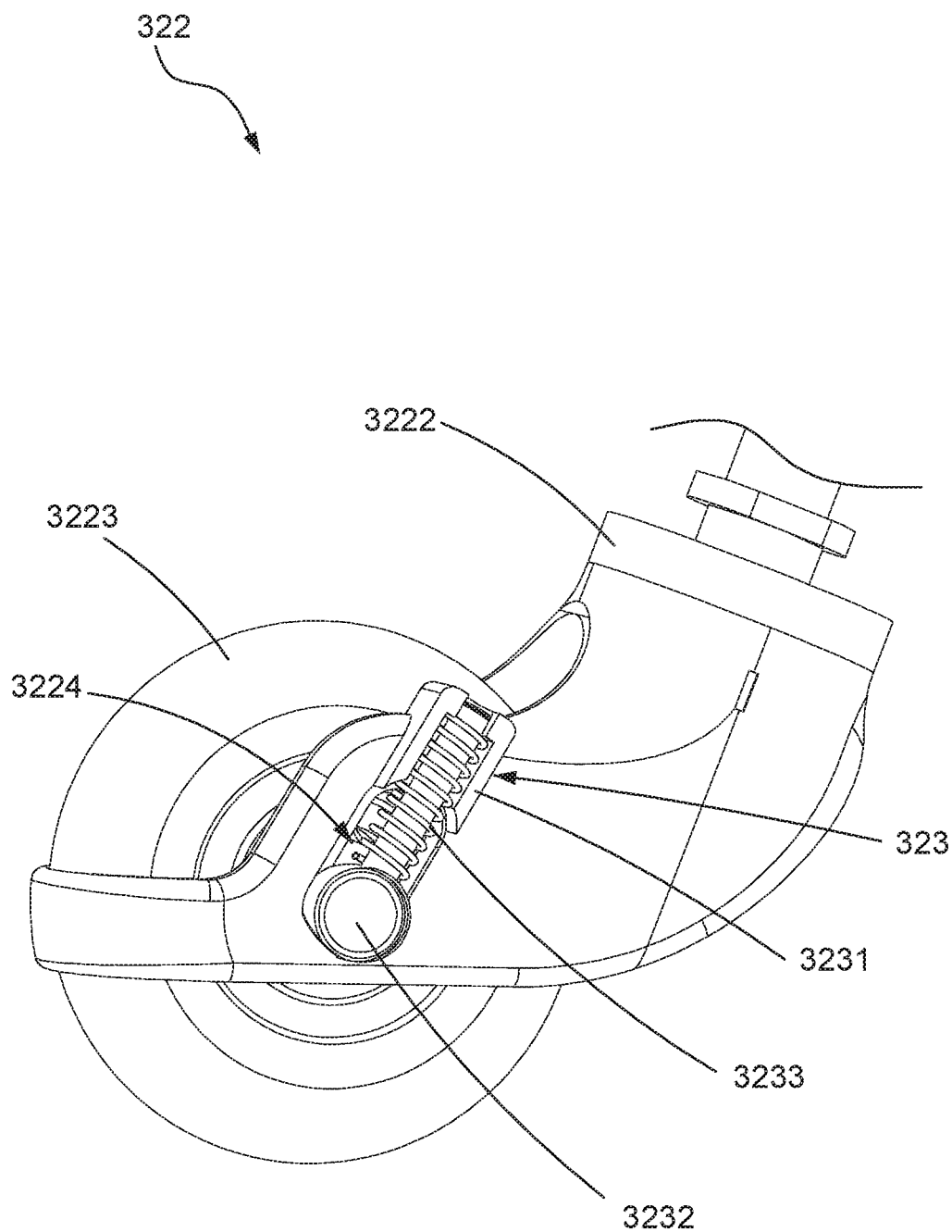
FIG. 11 is a schematic view showing that the control set is not weighted.

Referring to FIG. 9 and FIG. 10 show a second preferred embodiment of a skateboard 3 of this invention. The correlated elements, the concatenation of elements, the operation and objectives of the second preferred embodiment are the same as those of the first preferred embodiment. This embodiment is characterised in that a seat portion 35 is disposed on the board body 31 and two auxiliary holding portions 351 are formed on the seat portion 35 and located relative to each other. Further, a control set 323 is disposed on each second holder 3222. Referring to FIG. 11, the user can twist the body when siting on the seat portion 35 to move the first wheel 3213 and the second wheels 3223 forward, thereby reducing the instability caused by the twisting and swinging motions. Meanwhile, the user can hold the auxiliary holding portions 351 with hands to thereby increase the stability of use. Referring to FIG. 10, a pair of opposite grooves 3224 is formed on each second holder 3222. The control set 323 has a pair of limit units 3231 each disposed at one end of each groove 3224, a pair of engagement units 3232 penetrating the grooves 3224 and the second wheel 3223 and engaged together, and a pair of elastic units 3233 sleevedly disposed on the engagement units 3232 and capable of being compressed between the engagement units 3232 and the limit units 3231.

Figure 12:
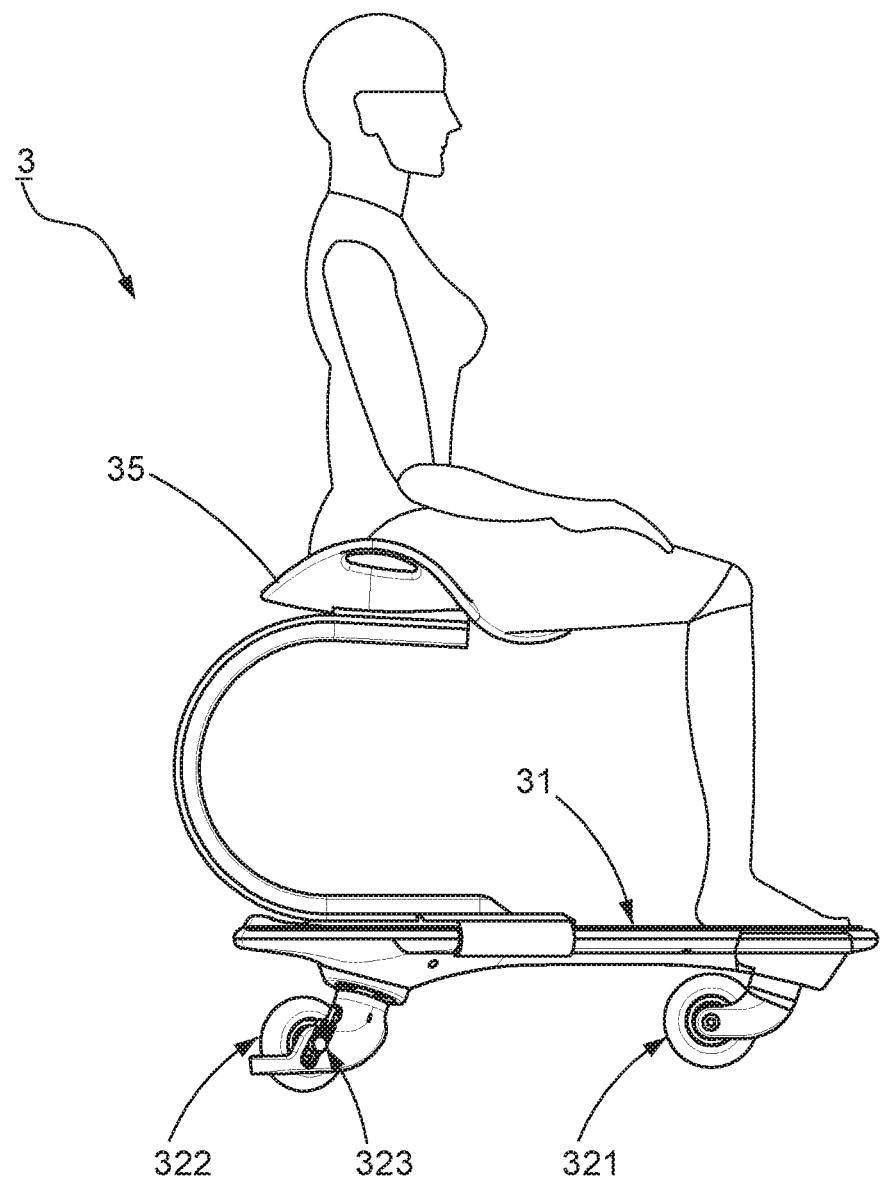
FIG. 12 is a schematic view showing that a user sits on the seat portion.
Figure 13:
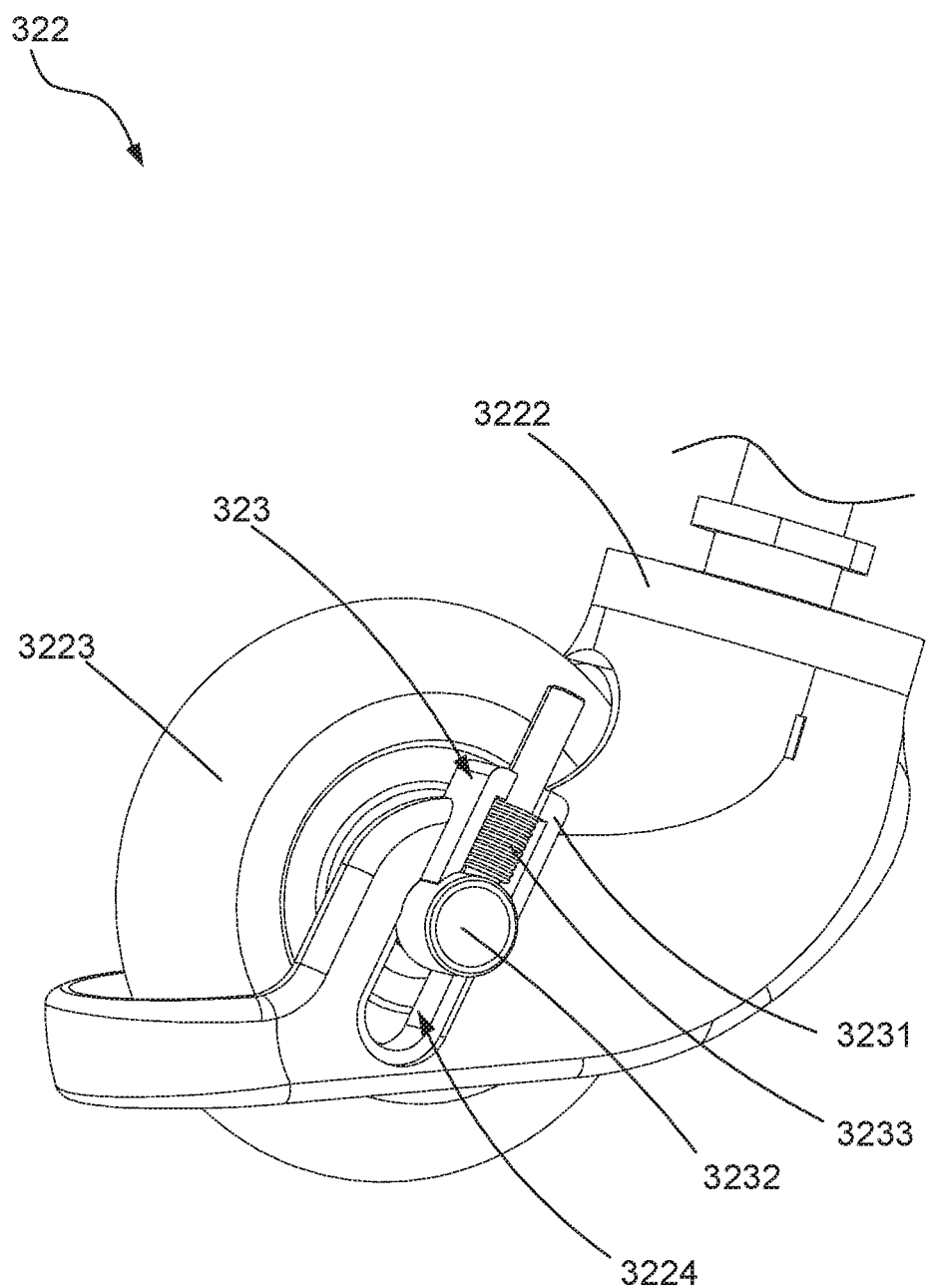
FIG. 13 is a schematic view showing that the control set is weighted.

Referring to FIG. 9 and FIG. 11, when the board body 31 is not weighted, namely the user does not sit on the seat portion 35, the elastic units 3233 push each engagement unit 3232 owing to the elasticity, and the engagement units 3232 then extend to another end of the grooves 3224 opposite to the limit units 3231 respectively whereby the second wheels 3223 are contacted and restricted by the second holder 3222. Thus, the second wheel sets 322 are stopped to attain the braking action owing to the engagement of the second wheels 3223 and the second holders 3222. On the contrary, referring to FIG. 12 and FIG. 13, when the user sits on the seat portion 35, the board body 31 is weighted by the weight of the user. Each second holder 3222 is then moved downwards caused by the gravity force of the user, and simultaneously the limit units 3231 push each elastic unit 3233.

Each elastic unit 3233 then contracts to allow each engagement unit 3232 to be separated from the end of the groove 3224 and the second wheels 3223 are also separated from the engagement of the second holder 3222. Thus, the second wheels 3223 are able to be moved. Hence, the user can control the movement of the second wheel sets 322 by leaving or weighting on the board body 31, thereby increasing the safety of use.

Figure 14:
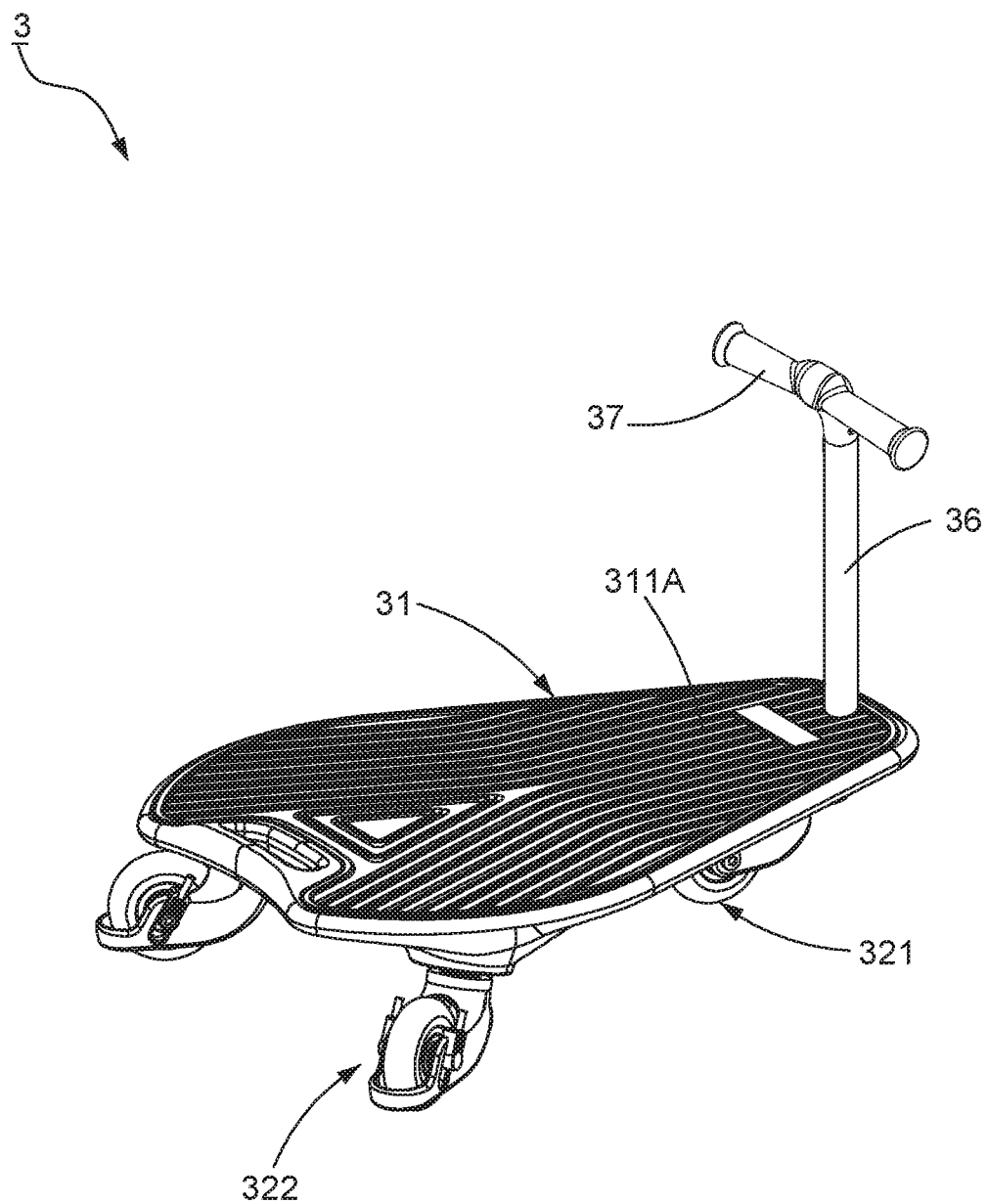
FIG. 14 is a perspective view showing a third preferred embodiment of this invention where the support rod and the handle portion are disposed on the first section.
Figure 15:
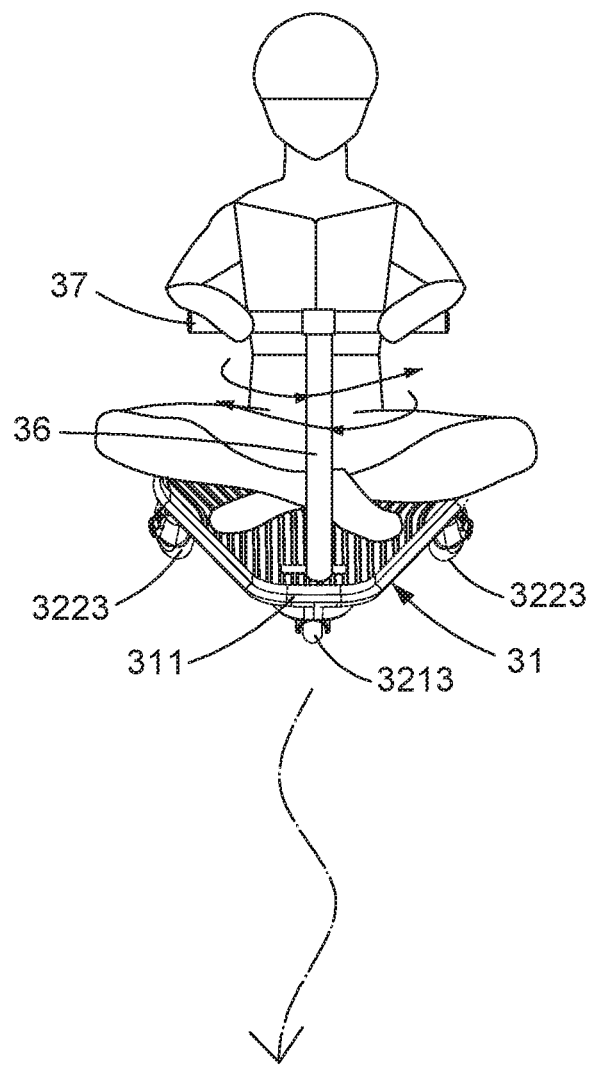
FIG. 15 is a schematic view showing that a user sits on the board body and holds the handle portion with hands.

Referring to FIG. 14 and FIG. 15 show a third preferred embodiment of a skateboard 3 of this invention. The correlated elements, the concatenation of elements, the operation and objectives of the third preferred embodiment are the same as those of the first preferred embodiment. This embodiment is characterised in that a support rod 36 is disposed on the first top 311A of the board body 31 and a handle portion 37 is connected to the support rod 36. Therefore, the user can sit or stand on the board body 31 and hold the handle portion 37 with hands. Here take an example as shown in FIG. 14 that the user sits on the board body 31 and holds the handle portion 37 with hands.

Thus, the support rod 36 and the handle portion 37 help the user to balance the center of gravity, and the user further twists the body to move the first wheel set 321 and the second wheel sets 322 forward, thereby increasing the variety and stability of use.

Figure 16:
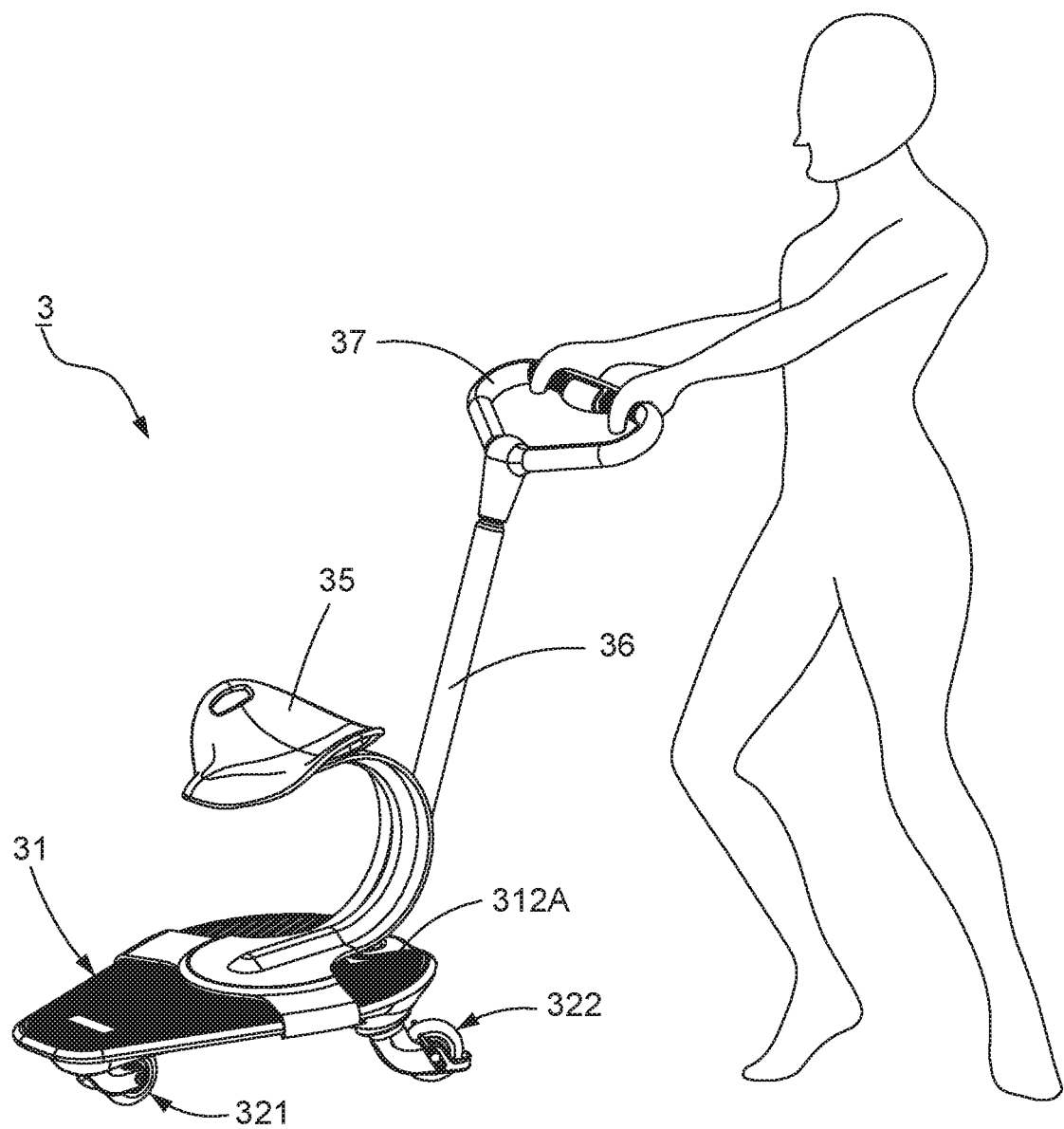
FIG. 16 is a perspective view showing a fourth preferred embodiment of this invention where the support rod and the handle portion are disposed on the second section.

Referring to FIG. 16 shows a fourth preferred embodiment of a skateboard 3 of this invention. The correlated elements, the concatenation of elements, the operation and objectives of the fourth preferred embodiment are the same as those of the second and third preferred embodiment. This embodiment is characterised in that the support rod 36 is disposed on the second top 312A of the board body 31. Thus, the user (not shown) can sit on the seat portion 35 and twist the body to move the first wheel set 321 and the second wheel sets 322 forward. Meanwhile, an attendant can hold the handle portion 37 and push the skateboard 3 to thereby help the forward movement of the skateboard 3 and assist in changing the moving direction of the skateboard 3, and this embodiment is suitable for young children who should be accompanied by adults. Thus, the parent-child relationship is improved and the safety and stability of use are increased.

To sum up, the skateboard of this invention takes advantages of the first angle ranging from 5 to 35 degrees, the second angle ranging 5 to 35 degrees, and the third angle being not more than 60 degrees to allow the user to carry out the forward movement of the first wheel set and the second wheel sets by twisting and swinging the body and to change the moving direction through shifting the center of gravity, thereby training different muscles and increasing the safety and stability of use. Further, the skateboard is suitable for all age groups, and that is preferable to the conventional skateboard.

While the embodiments of this invention are shown and described, it is understood that further variations and modifications may be made without departing from the scope of this invention.

What is claimed is:

1. A skateboard adapted to be propelled by twisting, said skateboard comprising a board body with opposite first and second central ends and a propelling wheel assembly connected to said board body for moving on a ground surface; wherein said board body has a first section extending from said first central end and a second section extending from said first section to said second central end, said propelling wheel assembly including at least a first wheel set pivotally connected to a first bottom of said first section facing said ground surface, at least two second wheel sets pivotally connected to a second bottom of said second section facing said ground surface, and a control set installed on each of said at least two second wheel sets, said first section having a first top opposite to said first bottom, said second section having a second top opposite to said second bottom, said first wheel set having a first base meeting said first bottom at a first joint and projecting from said first bottom, a first holder connected to said first base, and a first wheel pivotally disposed on said first holder, each of said at least two second wheel sets having a second base meeting said second bottom at a second joint and projecting from said second bottom, a second holder connected to said second base, a second wheel pivotally disposed on said second holder, and a pair of opposite grooves formed on said second holder, said control set being installed on said second holder of each of said at least two second wheel sets and having a pair of limit units each disposed at one end of each of said pair of grooves, a pair of engagement units penetrating said pair of opposite grooves and said second wheel and engaged together, and a pair of elastic units sleevedly disposed on said pair of engagement units and capable of being compressed between said pair of engagement units and said pair of limit units,
a horizontal line passing through said first joint and through said second joint respectively and being parallel to said ground surface, said first base being inclined to said horizontal line at a first angle ranging from 5 to 35 degrees, each of said second bases of said at least two second wheel sets being inclined to said horizontal line at a second angle ranging from 5 to 35 degrees, two reference lines being defined, each of said two reference lines passing through a center of any one of said second bases of said at least two second wheel sets, said board body defining a baseline passing axially from said first central end to said second central end and through a center of said board body, a third angle being formed between said reference line and said baseline and being not more than 60 degrees, said first wheel set being placed in said baseline.

2. The skateboard according to claim 1, wherein a distance defined between said ground surface and said second central end is larger than a distance defined between said ground surface and said first central end.

3. The skateboard according to claim 1, wherein said board body has a plurality of slots formed on said first top and said second top.

4. The skateboard according to claim 1, wherein said first top and said second top are provided with a friction surface.

5. The skateboard according to claim 1, further comprising a main holding portion formed on said second section.

6. The skateboard according to claim 1, further comprising a seat portion installed on said board body.

7. The skateboard according to claim 6, wherein said seat portion having two opposite auxiliary holding portions.

8. The skateboard according to claim 1, further comprising a support rod disposed on said board body and a handle portion connected to said support rod.

* * * * *